United States Patent [19]

Horikawa et al.

[11] Patent Number: 4,629,900

[45] Date of Patent: Dec. 16, 1986

[54] RADIATION IMAGE READ-OUT METHOD

[75] Inventors: Kazuo Horikawa; Hirosi Tanaka; Tokukazu Saito, all of Kanagawa, Japan

[73] Assignee: Fuji Photo Film Co., Ltd., Japan

[21] Appl. No.: 697,803

[22] Filed: Feb. 4, 1985

[30] Foreign Application Priority Data

Feb. 2, 1984 [JP] Japan ................................. 59-17516

[51] Int. Cl.⁴ ............................................ H05B 33/00
[52] U.S. Cl. ................................ 250/484.1; 250/327.2
[58] Field of Search .......................... 250/484.1, 327.2; 358/293, 284; 364/414

[56] References Cited

U.S. PATENT DOCUMENTS 2,262,156 11/1941 Barnes et al. ......................... 358/284
3,919,464 11/1975 Kondoh ................................ 358/293
4,521,812 6/1985 Knop .................................... 358/284

FOREIGN PATENT DOCUMENTS 2000514 3/1980 Fed. Rep. of Germany ...... 358/284

Primary Examiner—Alfred E. Smith
Assistant Examiner—Richard Hanig
Attorney, Agent, or Firm—Sughrue, Mion, Zinn, Macpeak, and Seas

[57] ABSTRACT

In a method of reading out a radiation image stored in a stimulable phosphor sheet by scanning the stimulable phosphor sheet by stimulating rays, preliminary read-out and final read-out are conducted. The read-out line density of the stimulating rays in the final read-out is detected in advance. Image read-out conditions and/or image processing conditions adjusted on the basis of image information obtained by the preliminary read-out are corrected in accordance with the read-out line density in the final read-out so that the same final read-out image information and/or the same image signal after image processing is obtained from the stimulable phosphor sheet carrying the same image information stored therein.

6 Claims, 4 Drawing Figures

FIG.IA
FIG.IB
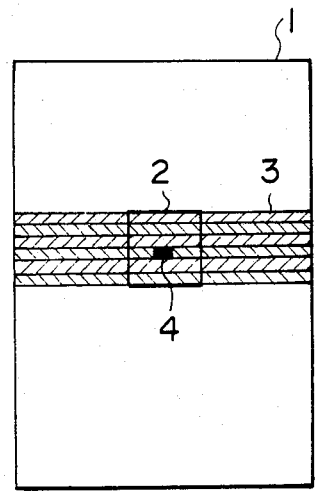
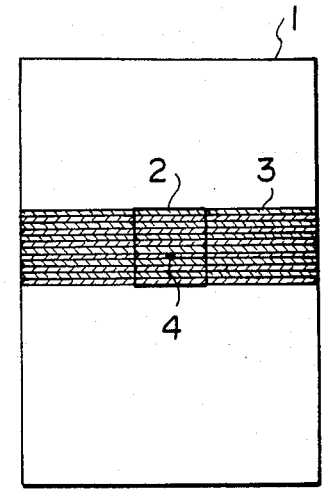
FIG.2
FIG.3
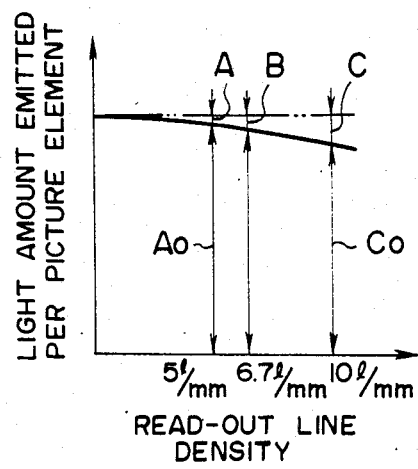
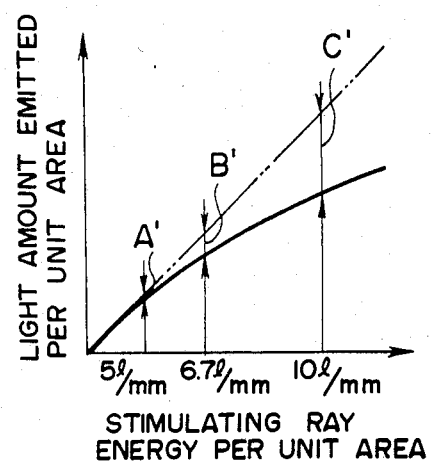

RADIATION IMAGE READ-OUT METHOD

BACKGROUND OF THE INVENTION

1. Field of the Invention

This invention relates to a radiation image read-out method used in a radiation image recording and reproducing system. This invention particularly relates to a radiation image read-out method for correcting final read-out conditions and/or image processing conditions adjusted on the basis of image information obtained by preliminary read-out in a radiation image recording and reproducing system wherein preliminary read-out and final read-out are carried out.

2. Description of the Prior Art

When certain kinds of phosphors are exposed to a radiation such as X-rays, α-rays, β-rays, γ-rays, cathode rays or ultra-violet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulale phosphor sheet or simply as a sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

One embodiment of the aforesaid radiation image recording and reproducing system is disclosed, for example, in Japanese Unexamined Patent Publication No. 58(1983)-67240. In the embodiment, before final read-out for scanning the stimulable phosphor sheet carrying a radiation image of an object stored therein by stimulating rays which cause the stimulable phosphor sheet to emit light in proportion to the radiation energy stored, detecting the emitted light by a photoelectric read-out means and converting it into an electric image signal is conducted, preliminary read-out for approximately detecting the image information stored in the stimulable phosphor sheet is conducted by use of stimulating rays of a level lower than the level of the stimulating rays used in the final read-out. Read-out conditions for the final read-out (hereinafter referred to as the final read-out conditions) and/or image processing conditions used in image processing of the electric image signal obtained by the final read-out (hereinafter simply referred to as the image processing conditions) are adjusted on the basis of the image information obtained by the preliminary read-out (hereinafter referred to as the preliminary read-out image information).

As described above, the level of the stimulating rays used in the preliminary read-out should be lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating rays source such as a laser beam source may be decreased in the preliminary read-out, or the stimulating rays emitted by the stimulating ray source may be attenuated by an ND filter, an AOM, or the like positioned on the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In image read-out by scanning a stimulable phosphor sheet carrying a radiation image stored therein by stimulating rays, it has theretofore been considered that the amount of light emitted per unit area of the stimulable phosphor sheet is proportional to the stimulating ray energy per unit area thereof.

This conventional assumption will be explained with reference to FIGS. 1A and 1B which are schematic views showing the conditions of scanning a unit area 2 at the same position of the same stimulable phosphor sheet 1 carring the same radiation image stored therein by stimulating rays at a low read-out line density and at a high read-out line density of the stimulating rays, FIG. 2 which is a graph showing the relationship between the read-out line density and the amount of light emitted per picture element, and FIG. 3 which is a graph showing the relationship between the stimulating ray energy per unit area of the stimulable phosphor sheet and the amount of light emitted per unit area of the stimualble phosphor sheet. Specifically, it has heretofore been considered that, if the stimulating ray energy per picture element 4 is maintained the same when the density of read-out lines 3 of the stimulating rays is doubled as shown in FIGS. 1A and 1B, the amount of light emitted per picture element 4 does not change as indicated by the chain line in FIG. 2 but only the number of picture elements per unit area changes in proportion to the square of the read-out line density. Since the stimulating ray energy per unit area=stimulating ray energy per picture element×number of picture elements per unit area, and the amount of light emitted per unit area=amount of light emitted per picture element×number of picture elements per unit area, the stimulating ray energy per unit area and the amount of light emitted per unit area change in proportion to the square of the read-out line density. Therefore, as indicated by the chain line in FIG. 3, if the stimulating ray energy per picture element is maintained the same when the read-out line density is changed, the amount of light emitted per unit area changes in proportion to the stimulating ray energy per unit area with the ratio of the amount of light emitted per picture element to the stimulating ray energy per picture element being the proportionality factor.

Therefore, in the radiation image recording and reproducing system wherein the preliminary read-out and the final read-out are carried out, even when the read-out line density in the final read-out (hereinafter referred to as the final read-out line density) is changed, the change in the final read-out line density has not heretofore been considered, and the final read-out conditions and/or image processing conditions have been adjusted on the basis of the preliminary read-out image information by presuming that the amount of light emitted per picture element is always the same if the stimulating ray energy per picture element is the same.

However, experiments conducted by the inventors revealed that, if the read-out line density of stimulating rays is changed when image read-out is carried out by scanning the unit area 2 present at the same position of the stimulable phosphor sheet 1 carrying the same radiation image by stimulating rays as described above, the amount of light emitted per picture element changes even when the stimulating ray energy per picture element is the same. For example, when the read-out line density is increased from that shown in FIG. 1A to that shown in FIG. 1B, the amount of light emitted by one picture element 4 in FIG. 1B becomes smaller than the amount of light emitted by one picture element 4 in FIG. 1A as indicated by the solid line in FIG. 2. Therefore, as indicated by the solid line in FIG. 3, the amount of light emitted per unit area 2 is not proportional to the stimulating ray energy per unit area 2.

Accordingly, in the radiation image recording and reproducing system wherein preliminary read-out and final read-out are carried out, even when the radiation image stored in the stimulable phosphor sheet is the same and the stimulating ray energy per picture element is the same, the amount of light emitted per picture element becomes different if the final read-out line density is different. As a result, the image information obtained by the final read-out (hereinafter referred to as the final read-out image information), i.e. the final read-out electric image signal becomes different. Therefore, when the final read-out conditions and/or image processing conditions are adjusted on the basis of the preliminary read-out image information by ignoring the change in final read-out line density, the final read-out image information and/or the image signal after the image processing is caused to change undesirably by the change in final read-out line density.

The picture element 4 is a division of a predetermined length present on the read-out line 3 of the stimulating rays. The predetermined length changes in accordance with the read-out line density and is, in general, inversely proportional to the read-out line density. Therefore, in general, the number of picture elements per unit area is proportional to the square of the read-out line density.

SUMMARY OF THE INVENTION

The primary object of the present invention is to provide a radiation image read-out method wherein the final read-out conditions and/or image processing conditions are adjusted so that the final read-out image information and/or image signal after image processing is consistently obtained from a stimulable phosphor sheet carrying the same radiation image stored therein even when the final read-out line density is different.

Another object of the present invention is to provide a radiation image read-out method wherein the final read-out conditions and/or image processing conditions are adjusted as described above, whereby a visible image having an improved image quality, particularly a high diagnostic efficiency and accuracy can be reproduced consistently regardless of a change in final read-out line density.

The above objects are accomplished by correcting the final read-out conditions and/or image processing conditions, which are adjusted on the basis of the preliminary read-out image information, in accordance with the final read-out line density.

The final read-out conditions and/or image processing conditions based on the preliminary read-out image information are corrected so that the final read-out image information and/or the image signal after image processing is consistently obtained regardless of a change in final read-out line density. Stated differently, the final read-out conditions and/or image processing conditions adjusted on the basis of the preliminary read-out image information are corrected by a value corresponding to the value of the change in amount of light emitted per picture element caused by the change in final read-out line density.

In the present invention, as described above, the final read-out conditions and/or image processing conditions are adjusted on the basis of the preliminary read-out image information so that the final read-out image information and/or the image signal after image processing becomes constant regardless of the final read-out line density. In other words, when the final read-out line density is changed, the aforesaid conditions are corrected by the value of the change in the amount of light emitted per picture element, which is caused by the change in final read-out line density, so that the same condition as when the amount of light emitted per picture element is the same is obtained.

Therefore, in the present invention, it is possible to adjust the final read-out conditions and/or image processing conditions so that the same final read-out image information and/or the same image signal after image processing are obtained even when the final read-out line density is different.

Also, since the final read-out conditions and/or image processing conditions can be adjusted as described above, it is possible to obtain the same final read-out image information and/or the same image signal after image processing even when the final read-out line density changes, thereby consistently reproducing a visible image having an improved image quality, particularly a high diagnostic efficiency and accuracy.

Further, when the final read-out conditions are adjusted as described above, it becomes possible to decrease the signal resolution at the time of signal recording and to constitute the components of the system such as an A/D converter, an image processor and a memory at a low cost.

BRIEF DESCRIPTION OF THE DRAWINGS

FIGS. 1A and 1B are schematic views showing the conditions of scanning of the stimulable phosphor sheet by stimulating rays at a low read-out line density and at a high read-out line density, FIG. 2 is a graph showing the relationship between the read-out line density and the amount of light emitted per picture element, and FIG. 3 is a graph showing the relationship between the stimulating ray energy per unit area and the amount of light emitted per unit area.

DESCRIPTION OF THE PREFERRED EMBODIMENTS

The present invention will hereinbelow be described in further detail with reference to the accompanying drawings.

In the case where, for example the amount of light emitted per picture element decreases as indicated by the solid line in FIG. 2 as the final read-out line density is increased, the final read-out conditions and/or image processing conditions are corrected so that the level of the final read-out image information and/or the level of the image signal after image processing increase by the value corresponding to the decrease amount A when the final read-out line density is 5 lines/mm, the decrease amount B when it is 6.7 lines/mm, or the decrease amount C when it is 10 lines/mm. The correction amounts A, B and C correspond to A', B' and C' in FIG. 3.

Specifically, the final read-out conditions are corrected as described below. For example, when the final read-out is carried out at a read-out line density of 5 lines/mm, the actual amount of light emitted per picture element is Ao. The final read-out gain is not adjusted so that an electric image signal of a predetermined level corresponding to Ao is obtained. Instead, the final read-out gain is adjusted so as to obtain an electric image signal of a predetermined level corresponding to the sum (Ao+A) of the actual light amount Ao and the decrease amount A. When the final read-out is conducted at a read-out line density of 10 lines/mm, the final read-out gain is adjusted so as to obtain an electric image signal of a predetermined level corresponding to the sum (Co+C) of the actual light amount Co and the decrease amount C.

The image processing conditions are corrected as described below. For example, when the final read-out is carried out at a read-out line density of 5 lines/mm, the final read-out is conducted by use of the read-out conditions determined by the preliminary read-out, and a constant fixed by the read-out scale factor is added to the electric image signal which corresponds to the emitted light amount Ao and which is obtained by the final read-out so that the level of the image signal becomes equal to the level of the electric image signal which will be obtained when the light amount (Ao+A), i.e. the sum of the actual light amount Ao and the decrease amount A, is detected by the final read-out carried out by using the read-out conditions determined by the preliminary read-out.

As described above, in the present invention, the final read-out conditions and/or image processing conditions adjusted on the basis of the preliminary read-out image information are corrected in accordance with the final read-out line density. The adjustment includes not only the case where both the final read-out conditions and image processing conditions are adjusted on the basis of the preliminary read-out image information but also the case where the conditions are adjusted on the basis of the preliminary read-out image information, the object, the image recording portion of the object and the image recording conditions. By "read-out conditions" are meant the conditions governing the relationship between the light emitted by the stimulable phosphor sheet at the final read-out step and the electric image signal generated from the emitted light by a photoelectric read-out means. By "image processing conditions" are means the conditions governing the relationship between the electric image signal sent to the image processing means and the electric image signal generated thereby.

In order to correct the final read-out conditions, it is also possible to change the stimulating ray energy and/or the read-out time in accordance with the read-out line density so that the amount of light emitted per picture element becomes constant even when the final read-out line density is changed. When the stimulating ray energy is changed, a stimulating ray source of a large capacity is required as the read-out line density becomes high. When the read-out time is changed, the signal recording time becomes long as the read-out line density becomes high.

The method of the present invention is based on the precondition that the final read-out is carried out by changing the final read-out line density. For example, when a desired read-out line density is determined in advance based on the size of the stimulable phosphor sheet, the sheet size is detected and the final read-out line density is adjusted on the basis of the detected sheet size. When a desired read-out line density in the final read-out is determined in advance based on the object, the image recording portion of the object or the image recording conditions, a bar code label or a magnetic recording medium carrying such information recorded thereon may be secured to the stimulable phosphor sheet. In this case, the information on the final read-out line density is detected from the label at the preliminary read-out step, and the final read-out line density is adjusted on the basis of the detected information.

We claim:

1. A radiation image read-out method wherein preliminary read-out by scanning a stimulable phosphor sheet carrying a radiation image of an object stored therein by stimulating rays of a level lower than the level of the stimulating rays used in final read-out so as to approximately detect the image information stored in the stimualble phosphor sheet on the basis of light emitted by the stimulable phosphor sheet during the scanning is conducted prior to the final read-out for scanning the stimulable phosphor sheet by the stimulating rays which cause the stimulable phosphor sheet to emit light in proportion to the radiation energy stored and detecting the emitted light by a photoelectric read-out means to obtain an electric image signal, read-out conditions for the final read-out and/or image processing conditions for use in image processing of the electric image signal obtained by the final read-out are adjusted on the basis of the image information obtained by the preliminary read-out, the radiation image read-out method comprising the steps of:
  (i) detecting in advance the read-out line density of the stimulating rays in the final read-out, and
  (ii) correcting the read-out conditions and/or the image processing conditions, which are adjusted on the basis of the image information obtained by the preliminary read-out, in accordance with the read-out line density in the final read-out.

2. A method as defined in claim 1 wherein said read-out conditions and/or said image processing conditions adjusted on the basis of the image information obtained by the preliminary read-out are corrected by a value corresponding to the value of change in the amount of light emitted per picture element on said stimulable phosphor sheet, which is caused by a change in the read-out line density in the final read-out.

3. A method as defined in claim 1 wherein the corrected read-out condition is the read-out gain in the final read-out.

4. A method as defined in claim 1 wherein the corrected read-out condition is the energy of the stimulating rays in the final read-out.

5. A method as defined in claim 1 wherein the corrected read-out condition is the read-out time in the final read-out.

6. A method as defined in claim 1 wherein the corrected image processing condition is the read-out scale factor.

* * * * *